June 6, 1933.  A. B. DE SALARDI  1,913,153
FLYING SHEAR AND CONTROL SYSTEM THEREFOR
Filed Aug. 14, 1931   3 Sheets-Sheet 1
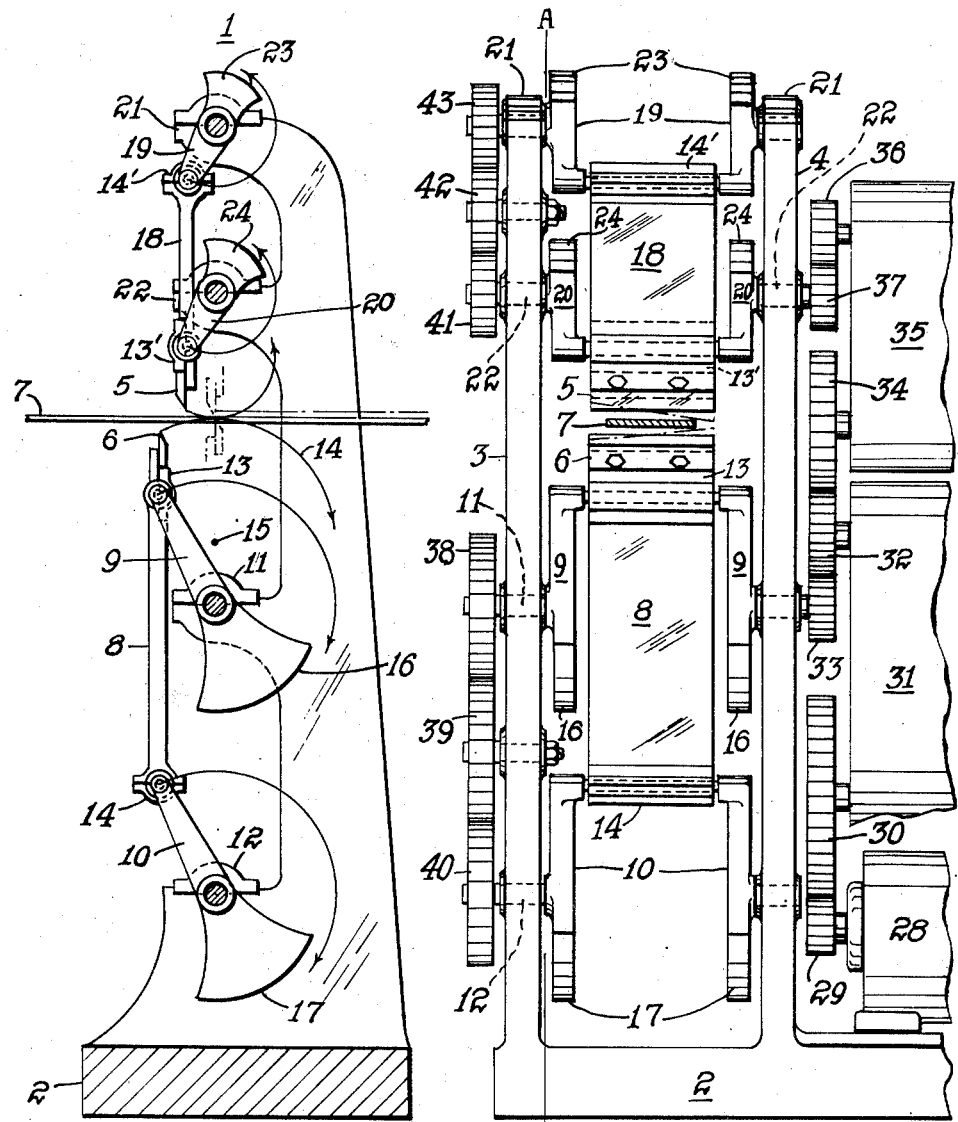
Fig. 1
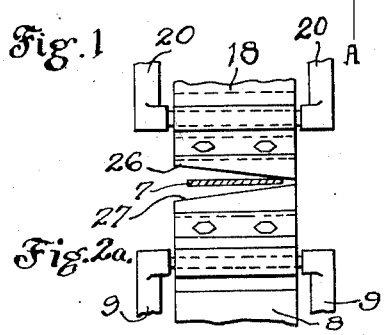
Fig. 2
Fig. 2a
Albert Bernhard de Salardi
INVENTOR.
BY Green & McCallister
His ATTORNEYS.

June 6, 1933.  A. B. DE SALARDI  1,913,153
FLYING SHEAR AND CONTROL SYSTEM THEREFOR
Filed Aug. 14, 1931    3 Sheets-Sheet 2

INVENTOR:
Albert Bernhardt de Salardi
BY Green & McCallister
His ATTORNEYS.

Patented June 6, 1933

1,913,153

UNITED STATES PATENT OFFICE

ALBERT BERNHARD DE SALARDI, OF WILKINSBURG, PENNSYLVANIA, ASSIGNOR TO MACKINTOSH-HEMPHILL COMPANY, A CORPORATION OF PENNSYLVANIA

FLYING SHEAR AND CONTROL SYSTEM THEREFOR

Application filed August 14, 1931. Serial No. 556,954.

This invention relates to shears adapted to cut stock, such as plates, bars, rods or the like, while in motion, into pieces of predetermined lengths, and to apparatus for automatically co-ordinating the speed of the shears to the speed at which the stock is moving so that the lengths of all cut pieces will be equal within predetermined minimum and maximum limits.

An object of this invention is the provision of a flying shear in which the shear blades shall approach the line of cutting in a direction that always bears a fixed angular relation to the line of travel of the moving stock to be cut.

Another object of the invention is the provision of a flying shear in which the line of motion of the shear blades, as they move to and from cutting position, shall always be at a fixed angle with respect to the line of motion of the stock cut thereby.

A further object of this invention is the provision of a flying shear in which all points in the shear blade shall have both reciprocating and rotary motions.

A still further object of this invention is the provision of a flying shear in which each point in the shear blade shall rotate about an independent center of rotation and in which said independent centers shall be disposed in a straight line so that the position of said shear blade may be always parallel to the line connecting said centers of rotation.

And a further object of the invention is the provision of a control system having means for automatically measuring the lengths of the pieces cut from moving stock and for automatically controlling the speed of operation of the shears in accordance with departures in the lengths of such cut pieces from a predetermined standard length.

Further objects of the invention will, in part, be apparent and will, in part, be obvious from the following description taken in conjunction with the accompanying drawings in which:

Figure 1 is a view in section of a flying shear, taken on line A—A of Fig. 2, arranged and constructed in accordance with an embodiment of the invention;

Fig. 2 is an end view of the shear shown in Fig. 1;

Fig. 2a is a fragmentary view of the shear showing an alternative form of shear blade;

Throughout the drawings and the specification like reference characters indicate like parts.

Figure 3:
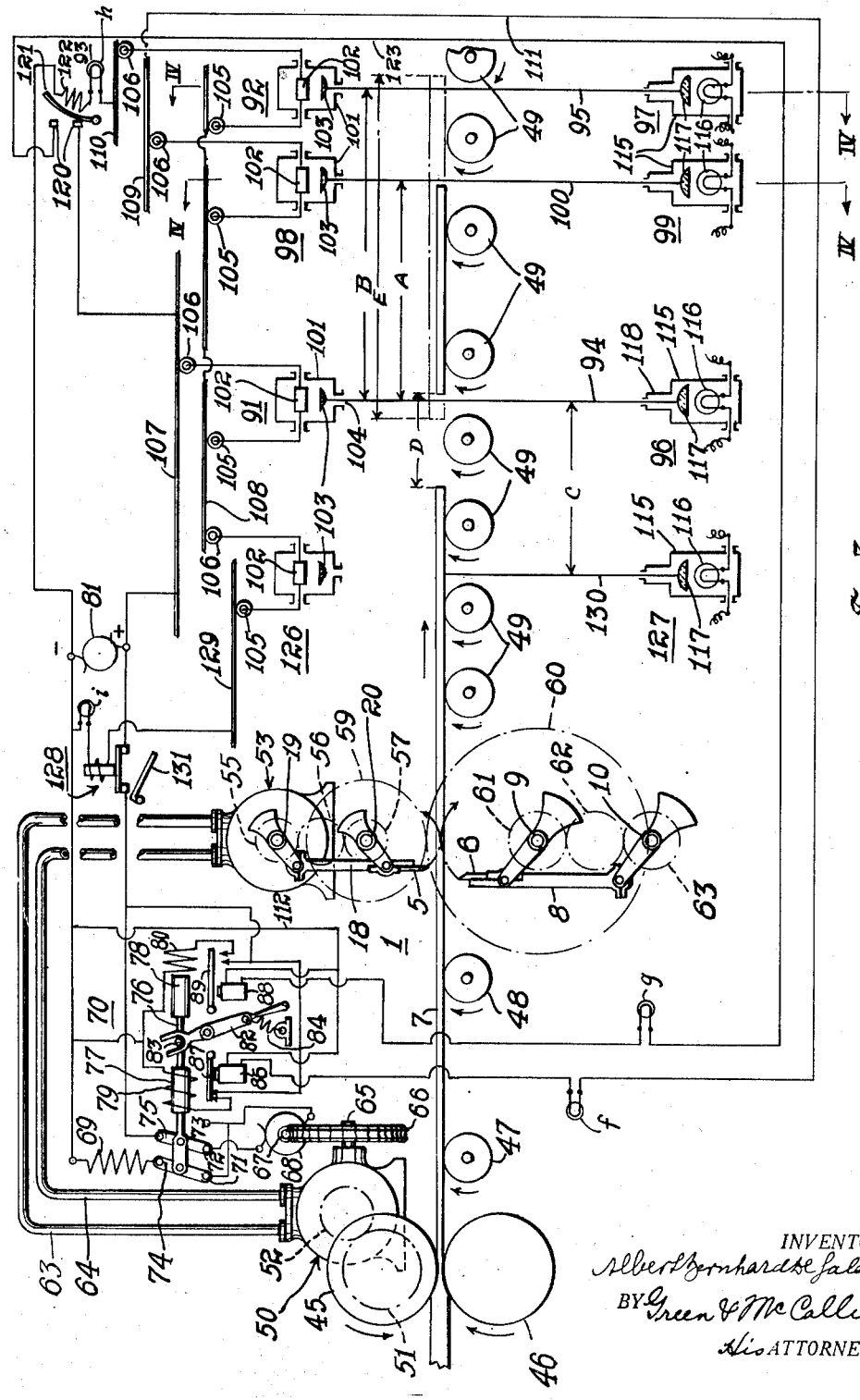
Fig. 3 is a diagrammatic illustration of a mill and a flying shear together with circuits and apparatus for controlling the lengths of the pieces cut from stock delivered by the mill to the shear while in motion.

In Figs. 1 and 2 of the drawings a flying shear, designated in its entirety by reference character 1, is shown, which, for purposes of illustration, comprises a base 2 having vertically disposed side frames 3 and 4 mounted thereon.

Shear 1 includes upper and lower shear blades or knives 5 and 6 between which stock 7 may be moved and pieces of predetermined lengths cut therefrom while the stock is in motion. The stock may be in the form of bars, plates, rods, strips etc. all of which are contemplated herein by the term "stock".

As will be more fully set forth herein, the shear blades or knives 5 and 6 are so mounted and operated that the stock, as it is delivered from a mill, may be cut into pieces of predetermined lengths while in motion.

The mounting and operating mechanism for shear blades or knives 5 and 6 is such that the motion of the blades or knives is both reciprocating and rotary; that is, each and every point in each knife moves in an independent circle about an independent center of rotation while the body of each knife or shear blade as a whole moves in a line which is at all times parallel to a straight line connecting said centers of rotation. Stated in another way, the shear blades or knives have a straight line reciprocating motion, so that the blades are always parallel to a line passing through the centers of rotation of the blades, and a component of motion which is at all times normal to the line of reciprocating motion.

Such motion of the shear blades or knives produces a true shearing action as will be more fully set forth herein.

It is appreciated that various arrangements and combinations of elements may be utilized to obtain the above described motions without departing from the spirit or the scope of the invention; therefore, in the interest of simplicity, a simple form of mechanism is shown by means of which the invention may be practiced.

As shown in Figs. 1 and 2, lower shear blade 6 is attached by means of bolts or other well known means to the uppermost end of a knife head 8. Knife head 8 is mounted on crank shafts 9 and 10 which are journalled in main bearings 11 and 12, respectively, carried by side frames 3 and 4. The bearing at the point of attachment of knife head 8 to crank shaft 9 is formed partly in the body of the knife head and partly by a bearing cap 13 which is bolted to the knife head.

Similarly, at the lower end of knife head 8 the bearing at the point of attachment of crank shaft 10 to the knife head is formed partly in the end of the knife head and partly by a bearing cap 14 which is bolted to the knife head. Such two-part bearings are well known in the art and may be constructed in a number of different ways.

Crank shafts 9 and 10, as illustrated, are of equal length and occupy the same angular position with respect to a straight line passing through the main bearings 11 and 12 carried in side frames 3 and 4.

Thus it will be apparent that as crank shafts 9 and 10 rotate, knife head 8 and the shear blade carried thereby will always be parallel to a plane passing through the centers of the main bearings of these crank shafts. It will also be apparent that each point in knife head 8 rotates in a circle about its own center and that such center lies along the line connecting the main bearings of the crank shafts. The radius of a circle described by such a point is equal to the length of the crank arms of crank shafts 9 and 10. Thus, it will be apparent that as crank shafts 9 and 10 rotate, knife head 8 and the shear blade carried thereby will have both rotary and reciprocating motions. Therefore the cutting edge of shear blade 6 will move in a circle such as indicated at 14, the center of which is at 15, but the knife head and shear blade as a whole will reciprocate and its line of motion will be always parallel to the line of centers connecting the main bearings of crank shafts 9 and 10. With the arrangement and location of the crank shafts, as illustrated in Figs. 1 and 2, the line of reciprocating motion of knife head 8 and the shear blade 6 will be always vertical.

In order that knife head 8 and the shear blade carried thereby may have a smooth balanced motion, crank shafts 9 and 10 are counter-balanced by masses 16 and 17 of such magnitude that the crank shafts, knife head and shear blade may be in a state of equilibrium in all positions to which they may be moved.

Upper shear blade 5 is attached to the lowermost end of a knife head 18 by bolts or other equivalent means and the knife head is carried by crank shafts 19 and 20 which are journalled in main bearings 21 and 22 carried by side frames 3 and 4. The bearings by which the crank shafts 19 and 20 are attached to knife head 18, are constructed in the same fashion as the corresponding bearings are constructed for crank shafts 9 and 10 and knife head 8. Thus corresponding or similar parts of the bearings associated with knife head 18 and crank shafts 19 and 20 are designated by primed characters 13' and 14'.

Crank shafts 19 and 20 occupy the same relative angular position with respect to a plane passing through the centers of the main bearings thereof and the crank arms thereof are of equal length. Thus, the motion of knife head 18 and the knife or shear blade 5 carried thereby will be similar to the motion of knife head 8 and shear blade 6 thereof.

Crank shafts 19 and 20 are counter-balanced by masses 23 and 24 in order that the crank shafts, the knife head carried thereby and the shear blade may be in a state of balance in each and every position to which they may be moved.

In practice the crank arms of crank shafts 9 and 10 may be of the same length as the crank arms of crank shafts 19 and 20 or they may be of different lengths. As illustrated the crank arms of crank shafts 9 and 10 are longer than the crank arms of crank shafts 19 and 20. In cases where it is desired that the knife heads 8 and 18 shall reciprocate in a vertical direction, the centers of the main bearings of crank shafts 9—10 and 19—20 will be disposed in line in the same vertical plane. However, if the line of reciprocating motion will best suit operating requirements if disposed at an angle to the vertical, the line of centers connecting the main bearings of the crank shafts may be tilted to one side or the other of such vertical line or plane.

If the stock to be cut by shear blades 5 and 6 is moving at a predetermined speed, it will be apparent that the length of the pieces cut thereby will be determined or governed by the ratio of the number of revolutions per unit of time at which the crank shafts 9 and 10 are rotating to the number of revolutions at which crank shafts 19 and 20 are rotating. To state a specific case, suppose that crank shafts 9 and 10 are rotating at four revolutions per unit of time and crank shafts 19 and 20 are rotating at five revolutions per unit of time, then shear blades 5 and 6 will meet in shearing position each fifth revolution of crank shafts 19 and 20.

With the arrangement illustrated in Figs. 1 and 2, the point at which the shearing of the stock is completed lies along the vertical plane connecting the centers of the main crank shaft bearings 11, 12, 21 and 22. However, it will be apparent that the beginning of the shearing action takes place to the left of the vertical line of centers as viewed from Fig. 1. If the shear blades are approaching the stock to be cut in the relative positions illustrated in full lines in Fig. 1, the shearing action will be completed when the shear blades occupy the relative positions indicated in broken lines in Fig. 1.

As illustrated in Fig. 2, the cutting edges of shear blades 5 and 6 are disposed parallel to the adjacent surfaces of stock 7 passing therebetween. However, the cutting edges of the shear blades may be disposed at an angle as indicated by broken lines 26 and 27 in Fig. 2a. If the stock to be cut is of relatively small dimensions, the cutting edges of the shear blades may be parallel to each other, but if the stock to be cut presents a large shearing width, the cutting edges of the knife blades may be disposed at an angle to each other as mentioned above.

In order that crank shafts 9 and 10 and 19 and 20 may be driven at speeds bearing a fixed ratio to each other, the crank shafts are connected positively by gear mechanism to a single driving motor 28. Motor 28 may be an electric motor and is mounted on the base of the machine, as indicated in Fig. 2. The armature shaft of motor 28 carries a pinion 29 that meshes with a driving gear 30 of a speed reducer 31, the end gear 32 of which meshes with a pinion 33 attached to crank shaft 9. End gear 32 meshes with a gear 34 associated with a speed-change gear box 35 having an end gear 36 that meshes with a pinion 37 attached to crank shaft 20. Thus, for any gear ratio between pinion 33 carried by crank shaft 9 and pinion 37 carried by crank shaft 20, it will be apparent that shear blades 5 and 6 will rotate and reciprocate at a definite fixed ratio with respect to each other.

In order that crank shafts 9 and 10 may be positively driven, a gear 38 is mounted on crank shaft 9 at the opposite end from which pinion 33 is mounted, and this gear meshes with an idling gear 39 carried by side frame 3 which in turn meshes with a gear 40 attached to crank shaft 10. Gears 38, and 40 have the same number of teeth, thus crank shafts 9 and 10 will be driven at the same speed and the crank arms of these crank shafts will always occupy the same relative angular position.

While gears 38, 39 and 40 are shown mounted on the ends of the crank shafts opposite to that on which pinion 33 is mounted, it is to be understood that all of these gears may be disposed on the same side of the machine as pinion 33. Such location of the gears would be preferred as it would lessen the working stresses in the driving crank shafts. The location of the gears, as illustrated, is merely for the sake of clearness and to prevent crowding of the drawings.

Crank shafts 19 and 20 are similarly connected by a gear 41 attached to crank shaft 20, an idling gear 42 mounted on side frame 3, and a gear 43 attached to crank shaft 19. These gears may also be mounted on the same side of the crank shafts as that on which pinion 37 is attached to crank shaft 20, but in order to simplify the drawings, the gears and pinions have been illustrated at opposite ends of the crank shafts.

With an arrangement such as illustrated in Figs. 1 and 2, it will be understood that the speed of motor 28 will be co-ordinated and controlled in accordance with the speed of the stock delivered from the rolling mill so as to insure uniformity in the lengths of the pieces cut from the stock.

Where an arrangement, such as shown in Figs. 1 and 2, is employed, the lengths of the pieces cut from the moving stock may be fixed or determined by selecting the proper gears operating in speed-change gear box 35. Thus the ratio of revolutions made by upper crank shafts 19—20 to the revolutions made by the lower crank shafts 9—10, may be so adjusted that, for a given speed of travel of the stock, the lengths of the pieces cut therefrom may be determined and fixed.

The lengths of the pieces cut may also be determined and fixed by changing the ratio of gear reduction between motor 28 and end gear 32 of the speed reducer; or the speed of motor 28 may be adjusted until the relation of the speed at which the shears are operating to the speed at which the stock is moving, is such that the desired lengths of cut pieces are obtained.

If, in practice, the speed at which the stock leaves the mill rolls remained constant, it would be a relatively simple matter to obtain uniformity in the lengths of the pieces cut therefrom, because as stated above, the mill roll speed and the speed of the shear driving-motor bear a fixed relation to one another. However, in practice, the speed of travel of the stock varies with the temperature thereof, as it passes through the mill rolls, and other well known factors. Therefore in order to obtain uniformity in the lengths of the pieces cut, the shear speed and the speed of travel of the stock must be so coordinated that the ratio of these speeds will remain practically constant. Thus, if the speed of the stock decreases, the shear speed must be reduced in proportion by reducing the speed of the shear driving motor; or if the stock speed increases, the shear speed must be increased in proportion by increasing the speed of the shear driving motor.

In order that the shear speed may be increased or decreased as the speed of travel of the stock increases or decreases, a system is required that will continuously measure the lengths of the pieces cut from the stock and automatically change the speed of the shear driving motor in response to and in accordance with departures in the lengths of such pieces from a predetermined standard. Thus, if the cut pieces are too long, the speed of the shear motor must be increased, or if too short, the motor speed must be decreased.

The matter of changing the speed of the shear driving-motor with respect to the mill roll speed may be accomplished in numerous ways. But in order to obtain the correct relative speeds, a control system should be employed that will effect such speed changes in incremental steps, the moment the lengths of the cut pieces vary from a predetermined standard.

In Fig. 3 of the drawings I have illustrated a set of mill rolls, a flying shear and a run-off table, together with a control system which in operation measures the lengths of the pieces cut from the stock delivered from the mill to the flying shear, and automatically controls the speed of the shear driving motor in accordance with variations or departures in the lengths of the cut pieces from a predetermined standard.

As shown in Fig. 3, a set of mill rolls 45 and 46 deliver stock 7 to flying shear 1. The stock as it leaves the mill rolls passes over a shear run-on table which is represented by rolls 47 and 48 disposed between the flying shear and the mill rolls, and a group of rolls 49, disposed to the right of the flying shear as viewed from Fig. 3, which represent the shear run-off table. The group of rolls 49 are driven at a higher speed than the rolls between the flying shear and the mill rolls, so that the pieces cut from the stock by the flying shear, may be propelled or moved forward at a higher speed of travel than that at which the stock approaches the shear from the mill rolls. Thus by choosing the proper difference between the operating speeds of the run-off table rolls and the run-on table rolls, the spacing between adjacent ends of pieces which have been cut from the stock may be predetermined and regulated to suit operating requirements.

Instead of employing an electric motor for driving shear 1 and the necessary control equipment for maintaining a fixed speed relation between the mill rolls and the shear driving motor, an hydraulic transmission is utilized, for example a Waterbury transmission. Such a transmission includes a pumping unit 50 which is driven by mill roll 45 through gears 51 and 52, and a receiving unit or motor 53, the rotor of which (not shown), is coupled to crank shaft 19. Crank shaft 19 carries a gear 55 that meshes with an idling gear 56 which in turn meshes with a gear 57 secured to crank shaft 20 of the flying shear. Thus it will be apparent that gears 55, 56 and 57 correspond to and perform the function of gears 41, 42 and 43 illustrated in Fig. 2.

Lower crank shafts 9 and 10 of the flying shear are driven from crank shaft 20 by means of gears 59 and 60. Gear 59 is mounted on crank shaft 20 and gear 60 is mounted on crank shaft 9. The lower crank shafts 9 and 10 are mechanically coupled by gears 61, 62 and 63 which correspond to and perform the function of gears 38, 39 and 40 shown in Fig. 2.

Liquid is circulated from pumping unit 50 to the receiving or motor unit 53 by means of pipes 63 and 64. The pressure and the quantity of liquid delivered by the pumping unit to the motor unit is controlled by regulating the effective stroke of pistons (not shown) disposed within the housing of the pumping unit. Such structure is well known in the art and is, therefore, illustrated only schematically as the details thereof are well known.

The stroke of the pistons in the pumping unit is regulated by means of a control shaft 65 which when turned in one direction or the other increases or decreases the stroke of the pistons. In order that the control shaft may be turned in one direction or another to effect a desired change in the piston stroke within the pumping unit and thereby to either increase or decrease the speed of the motor unit which drives the flying shear, a worm wheel 66 is mounted on shaft 65. A worm pinion 67 meshes with worm wheel 66, the pinion being driven by a reversing motor 68. The motor illustrated is of the direct current series type and includes an armature and a series field winding 69. A series motor is shown because it is easily and simply illustrated. However, either a shunt or a compound wound direct current motor would be more suitable for the purpose intended.

In order that the direction of operation of motor 68 may be reversed, a reversing switch 70 is provided. As illustrated the reversing switch has three positions: neutral, forward and reverse. When the switch is in the forward position worm wheel 66 and shaft 65 are turned in such a direction that the speed of the motor unit of the hydraulic transmission is increased to increase the speed of the flying shear in cases where the length of the pieces cut are longer than desired. If the switch is in the reverse position control shaft 65 is turned in the opposite direction thereby decreasing the speed of the motor unit 53 and the speed of the flying shear in cases where the lengths of the pieces cut from the stock are shorter than desired. When the switch is in neutral position the speed of the motor unit driving the flying shear is at the right or correct value with respect to the speed of travel of the stock to be cut. In other words, the speed relation between the moving stock and the shear is at the correct or desired value to produce cut pieces of the desired standard lengths.

Reversing switch 70 comprises stationary contact members 71, 72 and 73 and movable contact members 74 and 75. The movable contact members are connected to a rod 76 having cores 77 and 78 thereon. A solenoid 79 is provided for actuating the switch to its reverse position which is indicated in full lines in Fig. 3 and a solenoid 80 disposed adjacent to core 78 is provided for actuating the switch to the forward position. When the switch is in the reverse position movable contact members 74 and 75 engage stationary contact members 71 and 72, and when in the forward position they engage stationary contact members 72 and 73.

The source of power for energizing motor 58 and solenoids 79 and 80 is indicated at 81 and is preferably of the direct current type.

In order that switch 70 may be operated manually a lever 82 is provided. The upper end of lever 82 is bifurcated to accommodate a pin 83 attached to rod 76. Lever 82 is normally urged to a vertical position as viewed from Fig. 3 by means of a tension spring 84. When lever 82 is in a vertical position, switch 70 is in its neutral position. Thus spring 84 tends to urge switch 70 to its neutral position.

In order that solenoid 79 may be energized when it is desired to decrease the speed of motor unit 53 and the speed of flying shear 1, a relay 86 is provided. Relay 86 is preferably of the time delay type, that is, relay 86 is one which, when energized, remains closed, that is, in its circuit making position, for a predetermined length of time after it has been deenergized. Relay 86 is also of the type that will close even though it is only momentarily energized. Relay 86 includes an armature 87 which is disposed to bridge a pair of normally open contact members disposed in series with solenoid 79. Thus, when relay 86 is energized armature 87 will bridge these contact members and connect solenoid 79 to source of power 81 through a circuit which will be hereinafter described.

In order that switch 70 may be actuated to its forward position, to thereby increase the speed of motor unit 53 and the speed of flying shear 1, a relay 88 is provided. Relay 88 is similar to relay 86 and includes an armature 89 which, when the relay is energized, bridges a pair of normally open contact members disposed in circuit with solenoid 80. Thus, when these contact members are bridged by armature 89, solenoid 80 will be connected to source of power 81, through a circuit which will be hereinafter described, whereby armature 78 will be attracted by solenoid 80 and the switch actuated to its forward position.

In order that relay 86 may be energized to effect an increase in speed of motor unit 53 and flying shear 1 when the pieces cut from the moving stock 7 are longer than a predetermined standard length, light sensitive devices 91 and 92 and a circuit controlling device 93 are provided. Light sensitive devices 91 and 92 are disposed in the path of light beams 94 and 95, respectively, which emanate from light sending devices 96 and 97, respectively. Light sensitive devices 91 and 92 may be of the type which when exposed to light permit the flow of current therethrough and when not exposed to light no current flows. Relay 93 which is controlled conjointly by light sensitive devices 91 and 92 is of the type which is normally open, but which moves to its circuit closing position when light beams 94 and 95 are intercepted by a piece which has been cut from stock 7 by flying shear 1. Relay 93 when closed effects the energization of relay 88 so that when the pieces cut from stock 7 are too long, that is, longer than the predetermined standard of length, switch 70 will be actuated to its forward position whereby the speed of motor unit 53 and that of flying shear 1 is increased in the manner hereinbefore described. When the speed of flying shear 1 is increased it will be apparent that the pieces cut from stock 7 will be shorter.

In practice, light sensitive device 91 and light source 96 are spaced at such a distance from light sensitive device 92 and light sending source 97 that the distance between light beams 94 and 95 is equal to the maximum length of the pieces cut from stock 7. When the pieces cut from the stock are longer than distance B, and are equal to a length such as indicated by E, then light beams 94 and 95 will be intercepted and will be prevented from reaching light sensitive devices 91 and 92.

In order that the speed of motor unit 53 and that of flying shear 1 may be decreased when the lengths of the pieces cut from stock 7 are shorter than a predetermined minimum length, a light sensitive device 98 and a light emitting device 99 are provided. Light sensitive device 98 operates conjointly with light sensitive device 91 to control the energization of relay 86, which, as stated hereinbefore, is utilized to actuate switch 70 to its reverse position to affect a decrease in the speed of operation of motor unit 53 and that of flying shear 1. Light sensitive device 98 when exposed to a light beam 100 emitted from light source 99 becomes conductive in that it permits current to flow. Thus, if light sensitive device 91 and device 98 are both exposed to light beams 94 and 100 simultaneously, relay 86 will be energized as will be more fully set forth herein.

Light sensitive devices 91, 92 and 98 are similarly constructed and as shown include identical elements of construction. Therefore a description of device 91 will suffice for all. However, corresponding parts in all of these light sensitive devices will be designated by the same reference characters.

Light sensitive device 91 includes a housing or closure member 101 in which is disposed a light sensitive cell 102. Cell 102 may be a selenium cell although other forms of light sensitive devices may be employed, such as photo-glow and grid-glow tubes; but where such are used additional apparatus, as transformers, amplifiers and etc. are required in order that they may function properly. Of the light sensitive devices mentioned, the selenium cell is the simplest to illustrate.

Light sensitive device 91 also includes a lens 103 disposed adjacent to a window 104 in housing 101 through which light beam 94 passes.

Since in operation the standard of length of the pieces cut from stock 7 may vary from time to time, the position of light sensitive devices 91, 92, 98 and light source 96, 97 and 99 must be changed according to the lengths of the pieces into which stock 7 is to be cut. Therefore, in order that the light sensitive devices and the light emitting devices may be moved from one position to another, each light sensitive device is provided with contact rollers 105 and 106. Rollers 105 and 106 of light sensitive device 98 make contact with rail 108 and a rail 109, respectively, and rollers 105 and 106 of light sensitive device 92 make contact with rail 108 and rail 110. Rail 107 is connected to the positive terminal of the source of supply 81 and rail 109 is connected by a conductor 111 to one terminal of relay 86, and the other terminal thereof is connected by a conductor 112 to the negative terminal of the source of supply 81. Thus, when light beams 94 and 100 impinge on selenium cells 102 of light sensitive devices 91 and 98 simultaneously, current flows from the positive terminal of supply source 81 through rail 107, roller 106, cell 102 of device 91, rail 108, roller 105 of device 98, roller 106, rail 109, conductor 111, the coil winding of relay 86 and the conductor 112 to the negative terminal of supply source 81.

From the above description of the circuit connections of light sensitive devices 91 and 98, it will be apparent that the light sensitive cells 102 thereof are connected in series with relay 86 across the source of supply 81. Thus, when the pieces cut from stock 7 are shorter than distance A between light beams 94 and 100, relay 86 will be energized intermittently so long as such pieces are shorter than distance A, thus causing relay 86 to close and actuate switch 70 to the reverse position in which position, as stated previously herein, the speed of motor unit 53 and that of flying shear 1 is decreased which results in the longer pieces being cut from stock 7.

Light sending devices 96, 97 and 99, as illustrated, are of similar construction and embody corresponding or similar parts, hence a description of one will suffice for all and corresponding parts will be designated by similar reference characters.

Light sending device 96 comprises a housing or closure member 115 in which is disposed a source of light such as an electric incandescent light 116 and a lens 117 disposed between light source 116 and a projector 118 formed on housing 115. Incandescent light 116 may be connected to a suitable source of power so that a light beam, such as 94, will always be emitted through projector 118 in line with the opening 104 in light sensitive device 91.

Circuit controlling device 93 comprises a pair of contact members 120 and a bimetallic temperature responsive element 121 disposed to bridge contact members 120 when light beam 94 and/or light beam 95 are intercepted by pieces cut from stock 7 which are longer than distance B. Bimetallic member 121, so long as the pieces cut from stock 7 are shorter than distance B, occupies a curved position, as indicated in full lines in Fig. 3. Element 121 is caused to assume this position by the thermal energy which is imparted thereto from a resistor 122, which is disposed in series with light sensitive cells 102 of devices 91 and 92 across supply source 81 and energized when the pieces cut from stock 7 are shorter than the distance between light beams 94 and 95. Thus, the moment one or the other of light beams 94 and 95 is intercepted by a piece cut from stock 7, resistor 122 is deenergized thereby causing element 121 to cool. As it cools it assumes a straight line position and bridges contact members 120 whereby a circuit is completed for relay 88 that extends from rail 107, through contact members 120, bridged by bridging member 121, a conductor 123, the coil winding of relay 88 and conductor 112 to the negative side of supply source 81. Thus, relay 88 is energized and closed whereby solenoid 80 is energized and switch 70 is actuated to its forward position. When in its forward position, as stated hereinbefore, the speed of motor 53 and flying shear 1 is increased. Such increase in speed of motor 53 and shear 1 results in shorter pieces being cut from stock 7. The speed of motor 53 and shear 1 will gradually increase until light sensitive cells 102 of devices 91 and 92 are again exposed to light beams 94 and 95. When these light sensitive devices are exposed to these beams of light current flows through resistor 122 whereby bimetallic member 121 will be caused to assume its curved position in which position relay 88 is deenergized and switch 70 returned to its neutral position.

From the above it will be apparent that a system is disclosed whereby the speed of the flying shear may be coordinated to the speed at which stock 7 is moving so that the speed of the shear may be automatically increased or decreased until the pieces cut from the stock are of the desired predetermined standard of length.

During the operation of a system such as disclosed in Fig. 3, it may happen that the speed of the stock and the speed of operation of the flying shear are in the correct relation relative to one another to produce the desired standard length of cut pieces, when the stock delivered from mill rolls 45 and 46 to the flying shear runs out. In such case it is desirable to maintain the previous relative speeds between the moving stock and the flying shear so that when the feed of stock from the mill rolls is again renewed, the proper speed relation will exist between the flying shears and the stock. Therefore, in order to maintain the same speed of operation of the flying shear until the feed of stock is renewed, a light sensitive device 126, a light emitting device 127 and a relay 128 are provided. Light sensitive device 126 is like light sensitive device 91 and light emitting device 127 is like device 96. Hence corresponding and similar parts are designated by the same reference characters.

Relay 128 when energized disconects motor 68 from the source of supply 81 so that when relay 128 opens, motor 53 and flying shear 51 will continue to operate at the speed at which they were operating before the relay opened.

The coil winding of relay 128 is disposed in series with light sensitive cells 102 of devices 126 and 91 through a circuit that extends from rail 107, selenium cell 102 of device 91, rail 108, selenium cell 102 of device 126, a rail 129 and the coil winding of relay 128 to the negative side of supply source 81.

So long as stock is being delivered from mill rolls 45 and 46 to flying shear 1, light beam 130 emanating from light source device 127 will be intercepted by the material being cut as shown clearly in Fig. 3. However, when no material is being carried by rollers 49 adjacent to flying shear 1, light beam 130 will impinge on selenium cell 102 of device 126 and light beam 94 will impinge on selenium cell 102 of device 91 simultaneously. Thus, both of the selenium cells respond, in that the resistance thereof is lowered on account of exposure to light, and current flows from rail 107 through cells 102 of devices 91 and 126 and the coil winding of relay 128 to the negative side of the source of supply. Thus when relay 128 opens motor 68 is deenergized and the flying shear will continue to operate at the speed at which it was operating before the relay opened.

In practice light beams 130 and 94 are spaced a distance C apart, and this distance is such that it is always greater than distance D. As illustrated, distance D is the spacing between the end of a piece of stock which is in shearing position, but which has not been moved away from the flying shear, and the adjacent end of a piece which has been severed or sheared from stock 7. Thus, the stock which is in shearing position will not interfere with the measuring of the lengths of the cut pieces by devices 91—96, 98—99 and 92—97.

Lights $f$, $g$, $h$, and $i$, of different colors, may be connected in series with conductors 111, 123 and resistor 122 to indicate the working of the control system, and also to indicate whether the lengths of the pieces cut are longer or shorter than the desired length.

In order to provide for manual adjustment in the speed of flying shear, a movable contact member 131 is provided which may be opened and closed while relay 128 is open to effect operation of motor 68 until the necessary adjustments have been made in the relative speeds of flying shear motor 53 and the speed of the stock delivered from the mill rolls.

Figure 4:
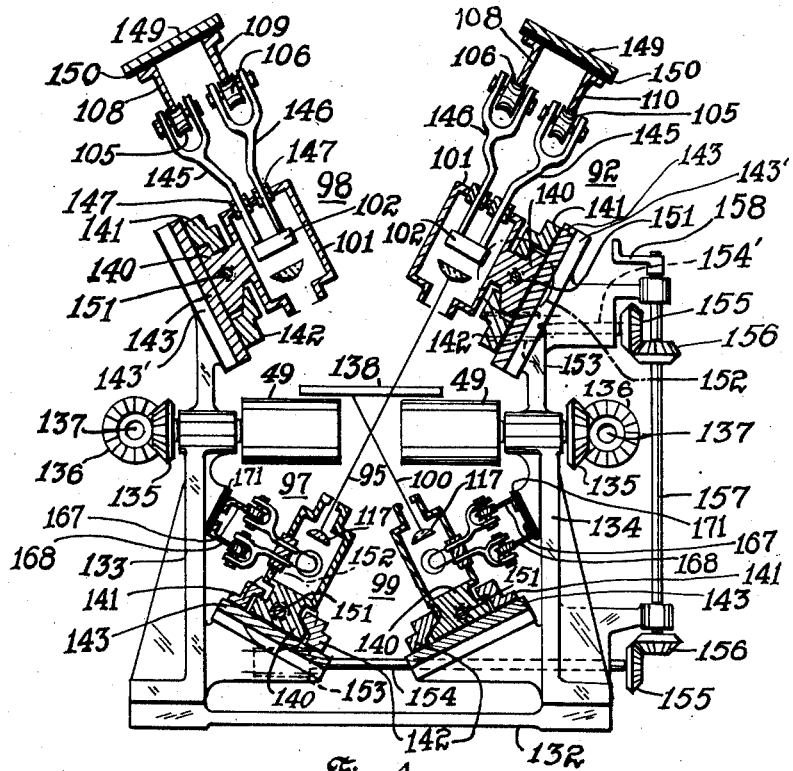
Fig. 4 is an end view of a shear run-off table and control apparatus illustrated in section.

In Fig. 4 of the drawings a form of construction of the run-off table and the mounting of the light sensitive devices and the light emitting devices are illustrated. The view illustrated in Fig. 4 being partly in section may be considered as taken along lines IV—IV of Fig. 3.

As illustrated in Fig. 4, the run-off table comprises a bedplate 132 having vertical side frames 133 and 134 mounted thereon. The side frames carry stub shafts on which the rollers 49 are mounted. The outer ends of the stub shafts are provided with bevel gears 135 that mesh with bevel gears 136 carried by line shafts 137 that extend longitudinally of the side frames of the run-off table. A piece which has been cut by the flying shear from stock 7 is indicated at 138. This piece rides on rollers 49 which are driven at a predetermined speed by the line shafts 137 and the gears associated therewith.

Light sensitive device 98 and light emitting device 99 are shown mounted on the side frames of the run-off table on each side of piece 138. These devices are so positioned that light beam 100 passes between the ends of rollers 49 and in line with the opening in housing 101 so that when piece 138 is shorter than distance A indicated in Fig. 3, this light beam will impinge on photocell 102.

Light sensitive device 92 is mounted on the opposite side of the table from light sensitive device 98 and light emitting device 97 is disposed below rollers 49 and on the opposite side of the run-off table from that on which device 99 is mounted. Devices 92 and 97 are disposed in alignment so that light beam 95 always impinges on photocell 102 of device 92 so long as the length of piece 138 is less than the distance B indicated in Fig. 3.

In Fig. 3 of the drawings it appears that light sensitive devices 92 and 98 are disposed at a considerable distance apart, but in actual practice these devices will be mounted in such position that light beams 95 and 100 will be relatively close together as determined by the maximum and minimum limits regarding the lengths into which pieces 138 may be cut. With the arrangement as illustrated in Fig. 4, these devices may be so adjusted that the light beams may intersect or so that the light beams may be spaced apart at any predetermined distance.

As illustrated in Fig. 4, housing 101 of light sensitive device 98 is mounted on a base 140 which is held in place by guides 141 and 142, the guides being secured to a plate 143 that extends longitudinally of side frame 133. Plate 143 is carried by brackets 143' suitably spaced along the side frames 133.

Rollers 105 and 106 through which current flows to selenium cell 102 are mounted on metallic supports 145 and 146 respectively that extend through housing 101 and into the interior thereof. Supports 145 and 146 are secured to the housing by means of insulator bushings 147. Rollers 105 and 106 engage rails 108 and 109 which are carried by a support 149 forming part of the run-off table. As illustrated, the rails 108 and 109 are insulated from support 149 by insulation as indicated at 150. Devices 92, 97 and 99 are mounted in place on the machine in the same manner as device 98, hence corresponding and similar parts are designated by the same reference characters.

In order that electric current may be supplied to lights 116 in devices 96, 97, 99 and 127, for any position to which they may be shifted, a pair of rails 167 and 168 may be mounted on side frames 133 and 134, which contact with rollers 169 and 170 connected to the terminals of the lights. The rails may be insulated from the frames as indicated at 171. It is to be understood that rails 167 and 168 are connected to the source of electric power supply.

In order that light sensitive device 92 and light sending or emitting device 97 may be maintained in exact alignment while being moved from one position to another, spindles 151 are provided that extend through the bases 140 and longitudinally of the run-off table. The spindles are provided with worm wheels 152 that mesh with worms 153 mounted on shafts 154 and 154' respectively. Shafts 154 and 154' have bevel gears 155 thereon that mesh with bevel gears 156 carried by a shaft 157 which may be turned by hand by means of a crank 158. Thus, by turning crank 158 in one direction or the other light sensitive device 92 and light emitting device 97 may be moved longitudinally of the run-off table either towards or away from flying shear 1.

Light sensitive device 98 and light emitting device 99 are also provided with spindles 151 for moving them longitudinally of the run-off table either towards or away from flying shear 1, the spindles being arranged for turning to move these devices by a similar arrangement as that illustrated for moving light sensitive device 92 and light emitting device 97.

Thus with an arrangement such as illustrated in Fig. 4, light sensitive device 92 and its cooperating light emitting device 97 and light sensitive device 98 and its cooperating light emitting device 99 may be moved towards or from each other until the desired distance is obtained between light beams 95 and 100.

It is to be understood that light sensitive devices 91 and light emitting device 96 and light sensitive device 126 with its associated light emitting device 127 are similarly mounted on the run-off table. Thus, all of these devices may be moved longitudinally of the run-off table until the proper adjustments are obtained that will insure close adherence in the lengths of the pieces cut from stock 7 to the standard length of piece to be cut as fixed or governed by the spacing of the light sensitive and light emitting devices.

Figure 5:
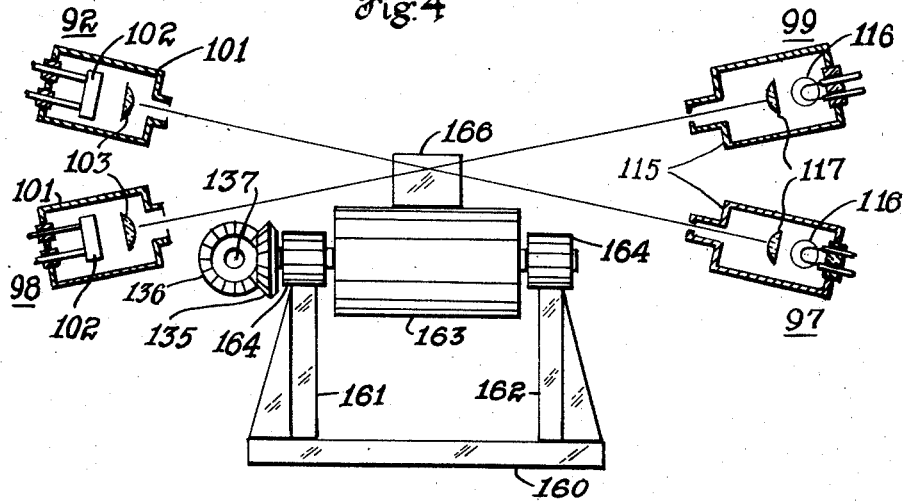
Fig. 5 is an end view of a modified form of run-off table and control apparatus, such as shown in Fig. 4 illustrated schematically.

In Fig. 5 of the drawings a modified form of run-off table is illustrated. The run-off table there illustrated comprises a bedplate 160 having vertical side forms 161 and 162 that carry a plurality of rollers 163. The supporting shafts of the rollers are journalled in bearings in the side forms as indicated at 164. Since roller 163 spans substantially the full distance between the side frames, the light sensitive devices and the light emitting devices are disposed above the table but in such position that the light beams will intercept the path of travel of the pieces cut from the stock by the flying shear, such a piece being indicated at 166. The view illustrated in Fig. 5 may be considered as taken along lines IV—IV of Fig. 3. Since the light sensitive devices and the light emitting devices shown in Fig. 5 are the same as those indicated in Fig. 4 and in Fig. 3, they are indicated by corresponding numerals.

In the operation of the system and the flying shear controlled thereby, upper and lower shear heads 18 and 8 are rotated and reciprocated at such speeds that the linear velocity of shear knives 5 and 6 are substantially equal to each other and also substantially equal to the linear velocity of moving stock 7. The pumping unit driven by mill roll 45 and the motor unit 53 which drives the flying shear are adjusted to obtain the above-mentioned relation between the linear velocity of the shear blades 5 and 6 and of the moving stock 7.

So long as the linear velocity of stock 7 remains constant, the pieces cut by the shear from the moving stock will be of uniform lengths and such lengths will be determined by, for a given velocity of stock, the number of times shear blades 5 and 6 meet in shearing position in a given unit of time.

The light sensitive control elements are spaced at such distances that if the lengths of the pieces cut from the stock are longer or shorter than a predetermined standard, control apparatus actuated by these light sensitive devices, will function to either increase or decrease the speed of the shear driving motor until the linear speed of shear blades and that of the moving stock are brought into the proper relation to produce cut pieces of a predetermined standard of length.

The shear blades 5 and 6 having both rotational and reciprocating motions, the shear blades will shear the stock into pieces with a straight line shearing motion. Thus, the stock is sheared in the true sense of the word and is not pulled apart. While the shear blades are passing through shearing position, the blades are also moving horizontally, or in line with the line of motion of the stock being cut. Thus the movement of the stock while being sheared does not interfere with such true shearing motion.

While but one form of shear has been illustrated and the system of control for governing the length of the pieces cut thereby is illustrated only schematically, it will be understood that various modifications and changes may be made in the apparatus and system disclosed without departing from the spirit and the scope of the invention. Although two forms of run-off table have been illustrated, it will be appreciated, by those skilled in this particular art, that the details of these tables admit of modifications and changes without departing from the spirit or the scope of the invention.

Having thus described the invention it is to be understood that only such limitations shall be placed thereon as are imposed by the prior art and the appended claims.

What I claim as new and desire to secure by Letters Patent is:

1. A flying shear comprising at least two independent groups of rotating multiple crank shafts in which the crank arms of a group are of equal lengths, a shear element carried by the crank arms of each group of multiple shafts in such manner that said shear elements have both rotational and reciprocating motions, and means for bringing said shear elements into shearing position when the crank shafts of one of said groups have turned a predetermined number of revolutions.

2. A flying shear comprising a plurality of independent groups of multiple crank shafts having their centers of rotation disposed in a common plane, a support carried by the cranks of each group of multiple shafts, the cranks in each group occupying the same radial position relative to each other, a shear blade carried by each support, and means for driving the crank shafts at such rotational speeds that when the crank shafts of one of said groups have turned a predetermined number of revolutions, the shear blade associated therewith will be in shearing position with the shear blade associated with another of said groups of multiple crank shafts.

3. In combination with feeding rolls, a flying shear for cutting stock while in motion, into pieces as it is delivered from said rolls, motor means for driving said shear, and means responsive to the lengths of the pieces cut from said stock for coordinating the speed of operation of said motor means to the speed of travel of the stock.

4. In combination with feeding rolls, a flying shear for cutting stock while in motion, into pieces as it is delivered from said rolls, motor means for driving said shear, and means responsive to the lengths of the pieces cut from said stock for increasing the speed of said motor means if the lengths of the pieces cut are greater than a predetermined standard of length, and decreasing the speed of said motor means when the lengths of said pieces are less than said predetermined standard.

5. In combination with feeding rolls, a flying shear for cutting stock while in motion, into pieces as it is delivered from said rolls, motor means for driving said shear, means responsive to the lengths of the pieces cut from said stock for increasing the speed of said motor means if the lengths of the pieces cut are greater than a predetermined standard of length, and decreasing the speed of said motor means when the lengths of said pieces are less than said predetermined standard, and means for rendering its length responsive means inoperative when no stock is passing through said shears.

6. The combination with a flying shear, an adjustable speed motor for driving said shear, control mechanism for increasing or decreasing the speed of said motor, and means for feeding stock to said shears to be cut into pieces of predetermined lengths, of electrical light sensitive devices disposed adjacent the line of motion of the cut pieces in predetermined spaced relation for controlling the speed of said motor as the cut pieces depart in length from the distances between said light sensitive devices.

7. The combination with a flying shear, an adjustable speed motor for driving said shear, means for feeding stock to the shear, and means for moving pieces cut from said stock away from the shear at a speed higher than that at which the stock approaches the shear, of control apparatus for regulating the speed of said motor, including electrical light sensitive devices spaced longitudinally of the line of motion of said cut pieces, the distance between certain of said devices being approximately equal to the minimum length of cut pieces, light sources disposed to project a beam of light on each light sensitive device, said light beams intersecting the line of motion of the stock, the said devices which define approximately the minimum length of cut pieces, when simultaneously exposed to light, being operative to initiate operation of the control mechanism to decrease the speed of said shear driving motor.

8. In combination with a flying shear, a motor for driving the shear, means for feeding stock to the shear to be cut while in motion, and a run-off table for moving pieces cut from the stock away from the shear, of a plurality of light beam projecting devices associated with said run-off table, the light beams of said devices being disposed to intersect the line of motion of said cut pieces, an electric light sensitive device disposed in the path of each light beam, said light beams being separated at points defining the minimum and maximum lengths of the cut pieces, and control apparatus responsive to the simultaneous exposure of predetermined pairs of said light sensitive devices to beams of light for coordinating the speed of said motor, hence the speed of operation of the shear, to the lengths of the pieces, cut from the moving stock.

9. The combination with an adjustable speed flying shear and a run-off table along which pieces of stock cut by said shear are moved, of a plurality of pairs of electric light sensitive devices and light beam projecting devices disposed longitudinally of said table with the light beams intersecting the line of motion of the pieces of stock, said devices being so spaced that the distance between one of said beams and consecutive beams define the maximum and minimum lengths of pieces of stock passing over said table, said devices being disposed to operate when said pieces deviate from said maximum and minimum lengths, and means controlled by the operation of said devices for adjusting the speed of the shear in accordance with the deviations in the lengths of the pieces cut, from the maximum and minimum lengths.

10. In combination with a flying shear, a motor for driving the shear, means for feeding stock to said shear to be cut into pieces, the lengths of which may vary between predetermined maximum and minimum lengths, and a run-off table for moving the pieces cut away from the shear, of a pair of serially connected electric light sensitive devices disposed along said run-off table and spaced apart at a distance proportional to the minimum lengths of the pieces to be cut, apparatus under the control of said light sensitive devices for decreasing the speed of the shear driving motor, light emitting devices arranged to project light beams upon said light sensitive devices, said devices intersecting the path of travel of said pieces, said sensitive devices when simultaneously exposed to said light being effective to actuate said control apparatus to decelerate said motor, another light sensitive device serially connected with one of the other of said devices, the spacing between which being proportional to the maximum lengths of pieces cut, a source of light having means for projecting a beam of light upon said last mentioned light sensitive device, said beam also intersecting the path of travel of said pieces, and control apparatus for increasing the speed of said shear driving motor when said last mentioned beam of light and the beam of light associated with the light sensitive device which is serially connected to said last mentioned sensitive device are intercepted by cut pieces of stock which are longer than the predetermined maximum length.

11. In combination with a flying shear, a motor for driving the shear, means for feeding stock to said shear to be cut into pieces, the lengths of which may vary between predetermined maximum and minimum lengths, and a run-off table for moving the pieces cut away from the shear, of a pair of serially connected electric light sensitive devices disposed along said run-off table and spaced apart at a distance proportional to the minimum lengths of the pieces to be cut, apparatus under the control of said light sensitive devices for decreasing the speed of the shear driving motor, light emitting devices arranged to project light beams upon said light sensitive devices, said beams intersecting the path of travel of said pieces, said sensitive devices when simultaneously exposed to said light being effective to actuate said control apparatus to decelerate said motor, another light sensitive device serially connected with one of the other of said devices, the spacing between which being proportional to the maximum lengths of pieces cut, a source of light having means for projecting a beam of light upon said last mentioned light sensitive device, said beam also intersecting the path of travel of said pieces, control apparatus for increasing the speed of said shear driving motor when said last mentioned beam of light and the beam of light associated with the light sensitive device which is serially connected to said last mentioned sensitive device are intercepted by cut pieces of stock which are longer than the predetermined maximum length, and means for simultaneously moving at least one of said light sensitive devices and the light source associated therewith longitudinally of the run-off table to increase or decrease the lengths of the pieces cut from said stock.

12. In combination with feeding rolls, a flying shear for cutting stock, while in motion, into pieces as it is fed to the shear by said rolls, and means responsive to the lengths of the pieces cut from said stock for coordinating the speed of operation of the shear to the speed of travel of the stock.

In testimony whereof, I have hereunto subscribed my name this 24th day of July, 1931.

ALBERT BERNHARD DE SALARDI.